United States Patent

Ohtsu

[11] Patent Number: 5,984,528
[45] Date of Patent: Nov. 16, 1999

[54] BEARING ASSEMBLY FOR BICYCLE PARTS

[75] Inventor: Tomohiko Ohtsu, Kaizuka, Japan

[73] Assignee: Shimano Inc., Osaka, Japan

[21] Appl. No.: 09/108,246

[22] Filed: Jul. 1, 1998

[51] Int. Cl.[6] .................................................. F16C 19/08
[52] U.S. Cl. ........................ 384/545; 384/458; 384/513
[58] Field of Search .................................. 384/545, 513, 384/504, 512, 458; 72/106, 105, 91; 29/898.066; 74/594.1, 594.2

[56] References Cited

U.S. PATENT DOCUMENTS

| | | | |
|---|---|---|---|
| 628,791 | 7/1899 | Germaine | 384/545 |
| 2,146,663 | 2/1939 | Vaughn | 384/512 |
| 4,150,859 | 4/1979 | Segawa et al. | |
| 5,181,437 | 1/1993 | Chi | 74/594.1 |
| 5,193,916 | 3/1993 | Andersson | 384/513 |
| 5,209,581 | 5/1993 | Nagano | 384/545 |
| 5,473,962 | 12/1995 | Yamamoto | 384/545 X |

FOREIGN PATENT DOCUMENTS

| | | | |
|---|---|---|---|
| 0469329A | 5/1992 | European Pat. Off. | |
| 3821051 | 12/1989 | Germany | 384/513 |
| 567713 | 2/1981 | Japan | |

*Primary Examiner*—Thomas R. Hannon
*Attorney, Agent, or Firm*—Shinjyu Global IP Counselors, LLP

[57] ABSTRACT

A bicycle bearing assembly has a spindle rotatably coupled within an outer tubular member via bearing members. The spindle preferably has a pair of annular grooves, which are formed in its outer surface by cold rolling the spindle. Similarly, the tubular outer member is cold rolled to form a pair of corresponding annular grooves in its internal surface. The cold rolling process of forming the tubular outer member results in its external surface also deformed to create a similar corresponding profile to the internal surface. This cold rolling creates a very smooth bearing surface for the bearing members. In one embodiment, the bicycle bearing assembly is a bottom bracket for a bicycle. In other embodiments, the bicycle bearing assembly is a hub for a wheel bicycle. The hub can be either a front hub or a rear hub.

25 Claims, 8 Drawing Sheets

BEARING ASSEMBLY FOR BICYCLE PARTS

BACKGROUND OF THE INVENTION

1. Field of the Invention

This invention generally relates to a bearing assembly for bicycle parts. More specifically, the present invention relates to a bicycle bearing assembly, which has inner and outer members formed by rolling, instead of by machining.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Also, bicycle manufacturers are also constantly improving the manufacturing techniques utilized to make the various components for reducing costs. One particular component of bicycles, which have been extensively redesigned over the past years, is the bearing assemblies, which are used to form the bottom bracket and the front and rear hubs.

The bottom bracket has a shell fixed to the frame of the bicycle and a spindle rotatably mounted within a portion of the bicycle frame. Bearings are installed between the outer tubular member and the spindle such that the outer tubular member rotates freely about the spindle. Pedals are coupled to the ends of the spindle by a pair of cranks. An example of a prior art bottom bracket is disclosed in U.S. Pat. No. 4,150,859 to Segawa.

Similarly, front and rear hubs for a bicycle have a hub axle or spindle rotatably coupled within an outer tubular member or shell. In the case of a hub, the hub axle or spindle is fixedly coupled to the bicycle frame and the outer tubular member or shell is fixedly coupled to the spokes of a bicycle wheel such that the bicycle wheel rotates about the axis of the hub axle or spindle. Bearings are installed between the outer tubular member and the hub axle or spindle such that the outer tubular member rotates freely about the hub axle or spindle.

The outer tubular members and the spindles are typically constructed through expensive machine operations. In particular, it is important that the bearing engagement surfaces of the outer tubular member and the spindle be smooth and without imperfections so that the spindle and outer tubular member rotate smoothly relative to each other via the ball bearings or bearing members. Typically, these machining operations produce small micro-grooves, which adversely affect the relative rotational movement between the spindle and the outer tubular member.

In view of the above, there exists a need for an improved a bicycle bearing assembly which overcomes the problems in the prior art devices and which is relatively easy to manufacture and assembly. This invention addresses this need in the prior art as well as other needs, which will become apparent to those skilled in the art from this disclosure.

SUMMARY OF THE INVENTION

One object of the present invention is to provide a bicycle bearing assembly, which is relatively easy to manufacture and assembly.

Another object of the present invention is to provide a bicycle bearing assembly, which is relatively inexpensive to manufacture.

Still another object of the present invention is to provide a bicycle bearing assembly, which can be manufactured without significant machining.

The present invention can basically be obtained by providing a bicycle bearing assembly comprising an elongated inner member, a tubular outer member and a plurality of first bearing members. The elongated inner member has a first end, a second end, and an outer surface extending therebetween, with at least a first annular groove formed in the outer surface of the elongated inner member. The tubular outer member has a first open end, a second open end, and internal and external surfaces extending between the first and second open ends of the tubular outer member. The internal surface of the tubular outer member is deformed to form a second annular groove in the internal surface of the tubular outer member and a first annular bulge in the external surface by formation of the second annular groove. The first bearing members are located between the first annular groove of the elongated inner member and the second annular groove of the tubular outer member.

The bicycle bearing assembly according to the present invention also preferably includes a third annular groove formed in the outer surface of the elongated inner member. The tubular outer member is further deformed to include a fourth annular groove in the internal surface of the tubular outer member and a second annular bulge in the external surface of the tubular outer member, which is formed by the formation of the third annular groove. A plurality of second bearing members are located between the third annular groove of the elongated inner member and the fourth annular groove of the tubular outer member.

In accordance with another aspect of the present invention, an outer race for a bicycle bearing assembly is provided. The outer race comprising a first open end, a second open end and a tubular member. The tubular member has internal and external surfaces extending between the first and second open ends, with the internal surface deformed to form a first annular groove in the internal surface and a first annular bulge in the external surface by the formation of the first annular groove. In accordance with this aspect of the present invention the outer race preferably also includes a second annular groove formed in the internal surface of the tubular member and a second annular bulge in the external surface of the tubular member by formation of the third annular groove.

The foregoing objects can also be attained by providing a method of forming a bicycle bearing assembly, comprising the steps of: forming an elongated inner member having a first end, a second end and an outer surface extending therebetween; forming a first annular groove in the outer surface of the inner member; forming a tubular outer member having a first open end, a second open end and internal and external surfaces extending between the first and second open ends of the tubular outer member; deforming the internal surface of the tubular outer member by rolling to form a second annular groove in the internal surface of the tubular outer member and forming a first annular bulge in the external surface of the tubular outer member by formation of the second annular groove; and inserting a plurality of first bearing members located between the first annular groove of the elongated inner member and the second annular groove of the tubular outer member.

The method of forming a bicycle bearing assembly in accordance with the present invention also preferably includes the steps of forming a third annular groove in the outer surface of the elongated inner member; deforming the internal surface of the tubular outer member by rolling to form a fourth annular groove in the internal surface of the tubular outer member and a second annular bulge in the external surface of the tubular outer member by formation of the fourth annular groove; and inserting a plurality of second bearing members between the third annular groove of the elongated inner member and the fourth annular groove of the tubular outer member.

Other objects, advantages and salient features of the invention will become apparent from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
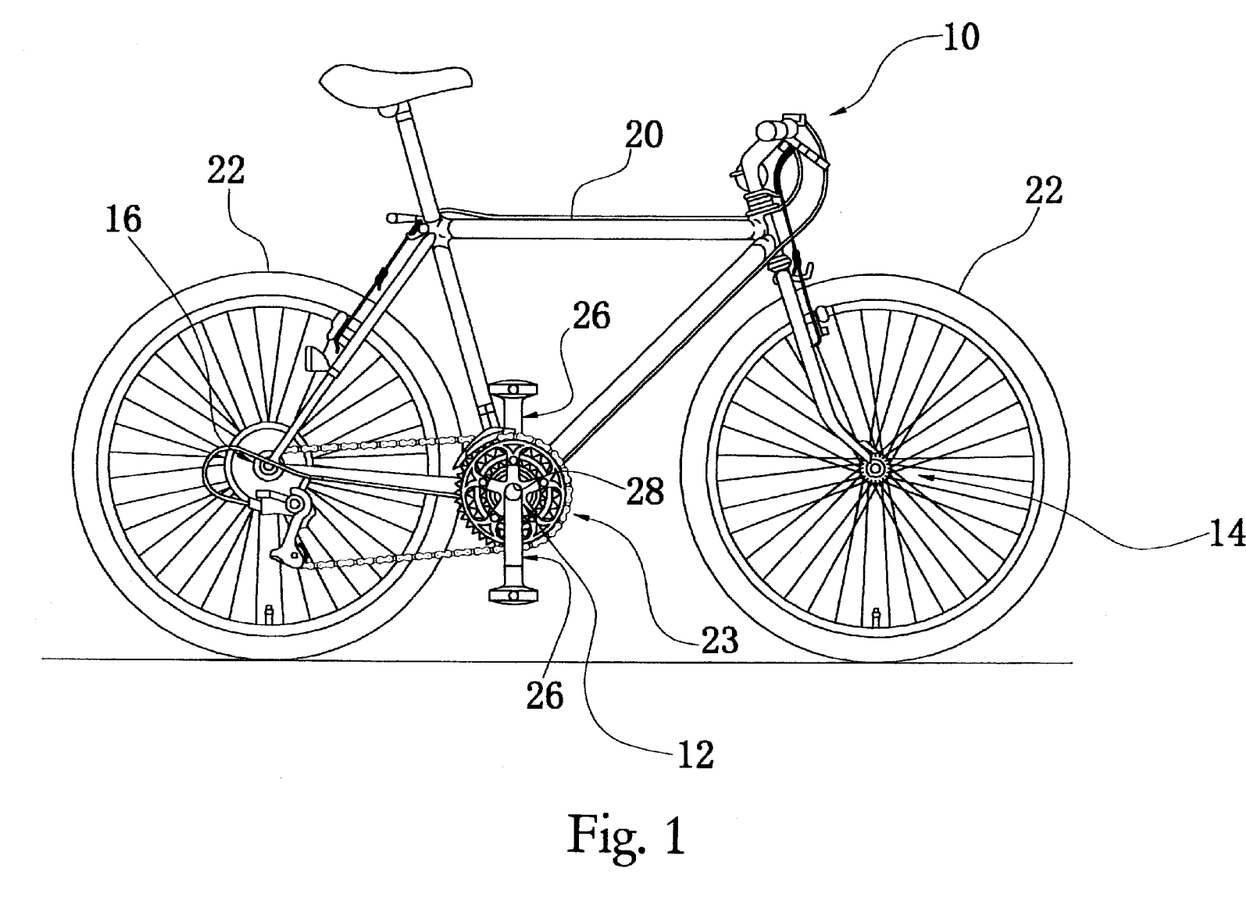
FIG. 1 is a side elevational view of a bicycle with bearing assemblies installed therein in accordance with one embodiment of the present invention.

Referring initially to FIG. 1, a bicycle 10 is illustrated with bicycle bearing assemblies 12, 14 and 16 coupled thereto in accordance with the present invention. Bicycle 10 basically includes a bicycle frame 20 with front and rear wheels 22 rotatably coupled thereto and a drive train 23. Bicycles such as bicycle 10 are well known in the art, and thus, bicycle 10 and its various components will not be discussed or illustrated in detail herein. It will be apparent to those skilled in the art that bicycle 10 can be any type of bicycle, e.g., mountain bike, a hybrid bike or a road bike.

Bicycle bearing assembly 12 is illustrated as a bottom bracket, which is coupled to bottom bracket shell 24 of bicycle frame 20. Bicycle bearing assembly 12 supports a pair of cranks 26 for rotation relative to frame 20. Bicycle bearing assembly 14 is illustrated as a front hub, which rotatably supports one of the wheels 22 to bicycle frame 20. Bicycle bearing assembly 16 is illustrated as a rear hub or free wheel, which rotatably supports the other of the wheels 22 to bicycle frame 20.

Figure 2:
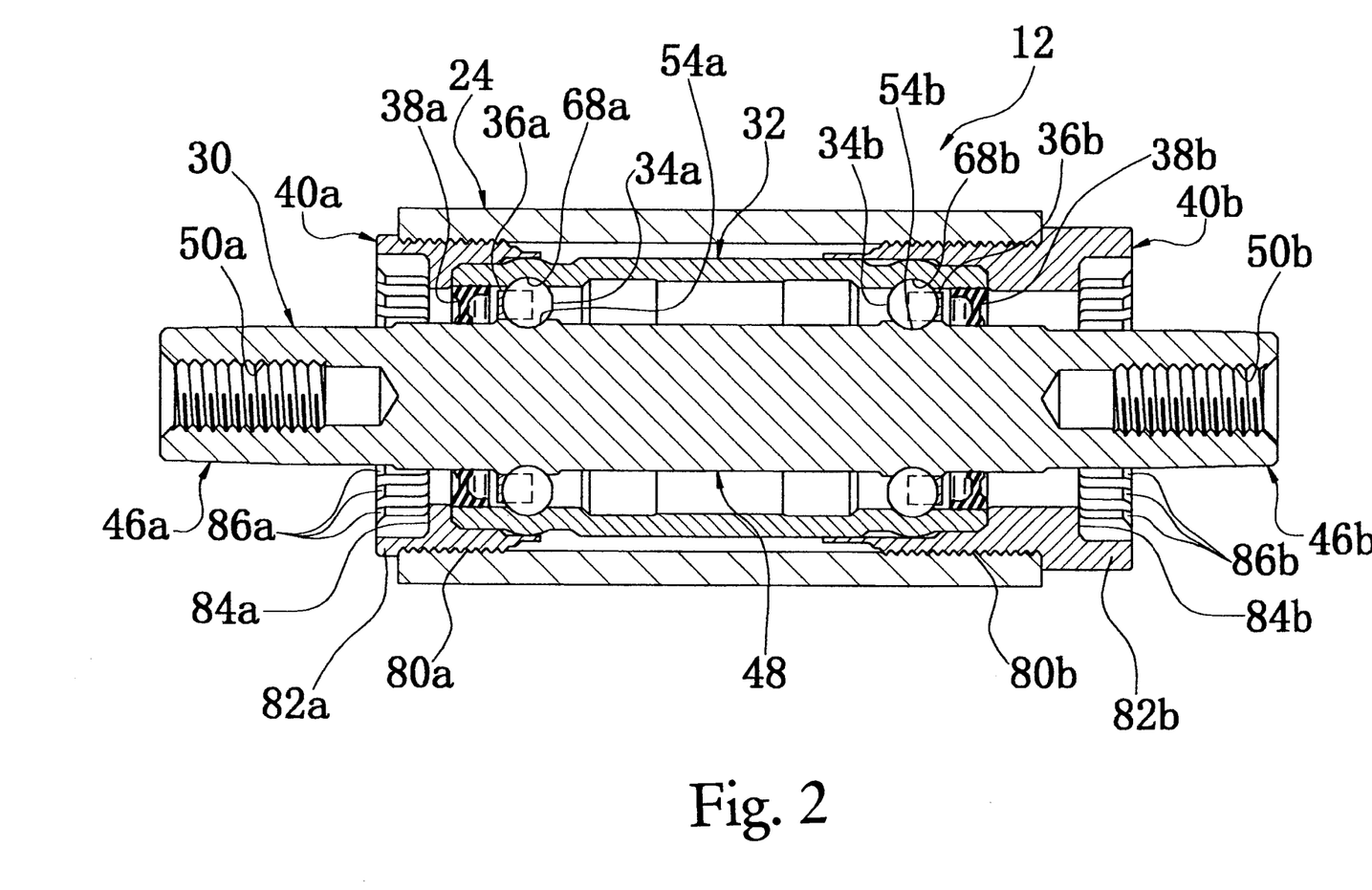
FIG. 2 is a partial longitudinal cross-sectional view of a bottom bracket shell of the bicycle frame and a first bearing assembly, which forms the bottom bracket of the bicycle illustrated in FIG. 1.

Referring now to FIG. 2, bearing assembly 12 forms the bottom bracket of bicycle 10 for rotatably coupling cranks 26 to bicycle frame 20. In particular, bearing assembly 12 is coupled to the bottom bracket shell 24 of bicycle frame 20, and cranks 26 are non-rotatably coupled to the ends of bearing assembly 12 by fixing bolts 28 (only one shown in FIG. 1). Bearing assembly 12 basically includes an elongated inner member or crank spindle 30, a tubular outer member or shell 32, two sets of bearing members 34a and 34b, a pair of retainers or cages 36a and 36b, a pair of seals 38a and 38b and a pair of adapters 40a and 40b.

Crank spindle 30 is designed to rotate within tubular outer member 32 via bearing members 34a and 34b. Accordingly, crank spindle 30 acts as an inner race, which is fixedly coupled to cranks, while tubular outer member 32 acts as an outer race, which is fixedly coupled to the bottom bracket shell 24 of bicycle frame 20. The bearing members 34a and 34b are preferably steel balls with each set of bearing members 34a and 34b having seven steel balls therein. Of course, it will be apparent to those skilled in the art from this disclosure that fewer or more steel balls can be utilized in each set of bearing members 34a and 34b.

Figure 3:
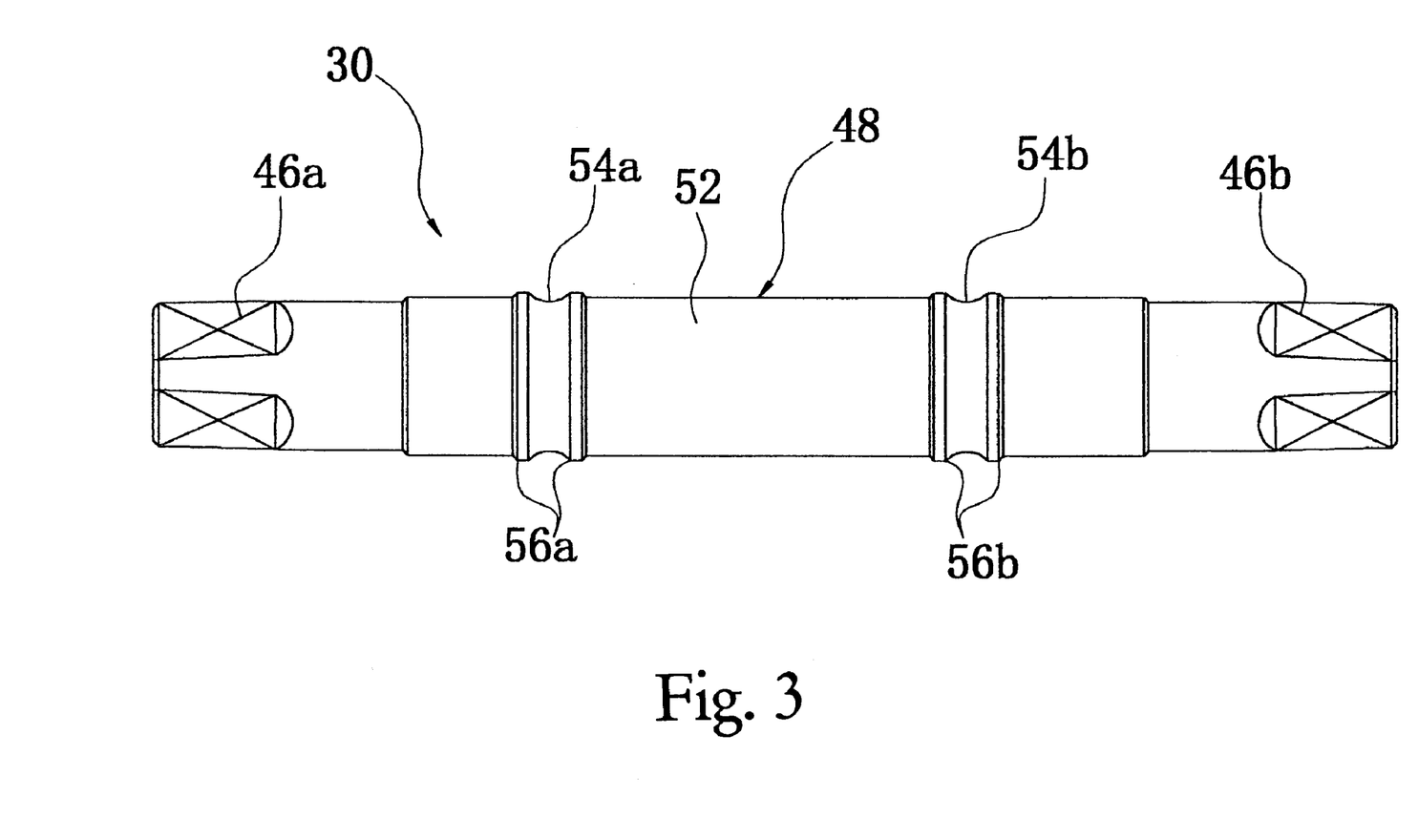
FIG. 3 is a side elevational view of the crank spindle or inner member for the first bearing assembly, which forms the bottom bracket of the bicycle illustrated in FIG. 1.

Referring now to FIG. 3, crank spindle 30 is an elongated member having a first end 46a, a second end 46b and an outer surface 48 extending between first end 46a and second end 46b. First and second ends 46a and 46b, respectively, have axially extending threaded bores 50a and 50b for threadedly receiving one of the fixing bolts 28 to fixedly secure one of the cranks 26 thereto. Outer surface 48 along the first and second ends 46a and 46b of crank spindle 30 has a non-circular cross-section for non-rotatably receiving one of the cranks 26 thereon. For example, outer surface 48 along first and second ends 46a and 46b can have a plurality of flat surfaces formed thereon. Alternatively, serrations could be formed at first and second ends 46a and 46b of crank spindle 30. The serrations are obtained by integrally forming eight projections of an angular cross-section at circumferentially spaced positions of the first and second ends 46a and 46b. Preferably, the first and second ends 46a and 46b taper outwardly towards the free ends of crank spindle 30. In any event, the cranks 26 have mating internal bores for non-rotatably coupling first and second ends 46a and 46b of crank spindle 30 thereto.

The crank spindle 30 has a center section 52 located between first and second ends 46a and 46b. Center section 52 has a pair of annular raised portions with first and second annular grooves 54a and 54b formed therein for receiving bearing members 34a and 34b. Also a pair of races 56a and 56b are formed on the sides of grooves 54a and 54b for retaining bearing members 34a and 34b therein, respectively. As explained later in more detail, annular grooves 54a and 54b as well as the remaining portion of the outer surface 48 of center section 52 is formed by cold rolling crank spindle 30 between a pair of dies 90 and 91.

The grooves 54a and 54b of crank spindle 30 are grooves of a circular cross-section for supporting steel balls or bearing members 34a and 34b. The diameter of the grooves 54a and 54b of crank spindle 30 are substantially equal to the diameter of the steel balls or bearing members 34a and 34b or slightly larger than the diameter of the steel balls or bearing members 34a and 34b. Accordingly, bearing members 34a and 34b can freely rotate and move about the circumference of annular grooves 54a and 54b.

Figure 4:
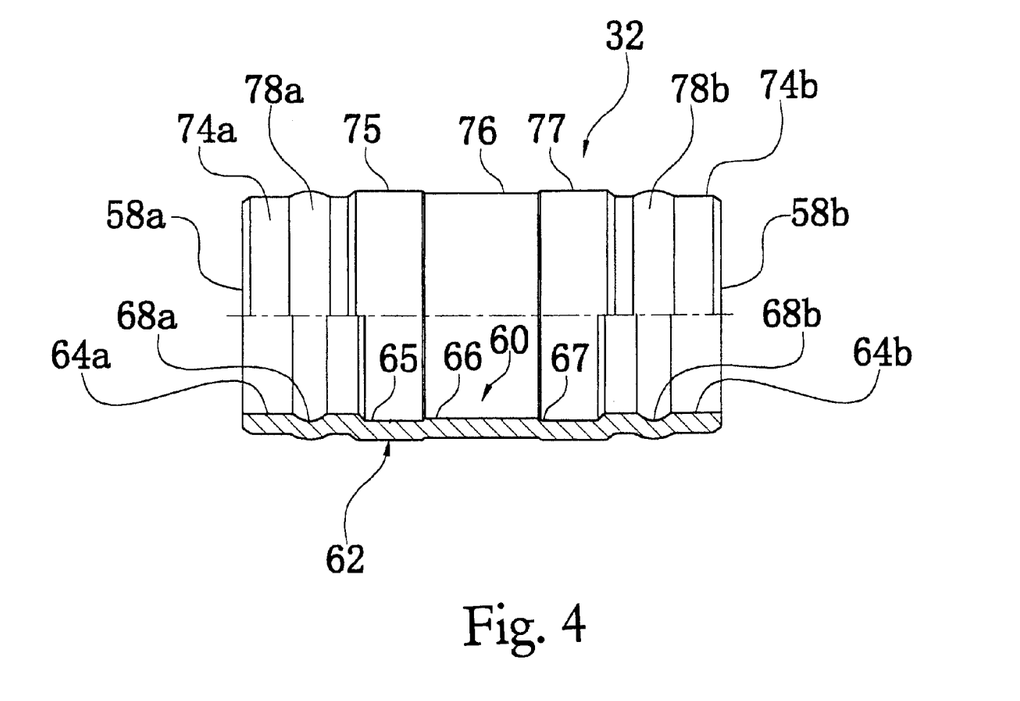
FIG. 4 is a partial longitudinal cross-sectional view of the outer tubular member or shell for the first bearing assembly, which forms the bottom bracket of the bicycle illustrated in FIG. 1.
Figure 5:
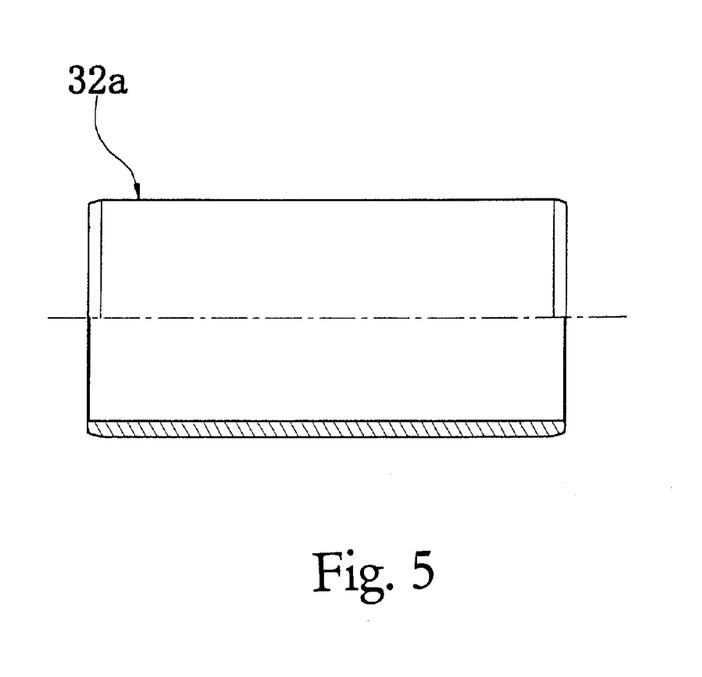
FIG. 5 is a partial longitudinal cross-sectional view of the outer tubular member or shell for the first bearing assembly, prior to being deformed.

Referring now to FIG. 4, a partial longitudinal cross-sectional view of the tubular outer member or shell 32 for the first bearing assembly 12 is illustrated. Tubular outer member 32 has a first open end 58a, a second open end 58b, an internal surface 60 and an external surface 62. The internal and external surfaces 60 and 62 extend between the first and second open ends 58a and 58b of tubular outer member 32. Preferably, tubular outer member 32 is constructed of a conventional metallic material. Tubular outer member 32 is initially a tubular or cylindrical sleeve 32a as seen in FIG. 5. The sleeve 32a is cold-rolled, as explained below, to form the profile of the tubular outer member 32 as seen in FIG. 4.

In particular, the internal surface 60 is contoured to form a pair of cylindrical end sections 64a, 64b and three center cylindrical sections 65, 66 and 67. The cylindrical end sections 64a and 64b are substantially identical to each other but mirror images of each other. Each of the cylindrical end sections 64a and 64b has an annular groove 68a and 68b formed therein for engaging bearing members 34a and 34b. Preferably, the grooves 68a and 68b are grooves of a circular cross-section for supporting bearing members 34a and 34b. The diameter of the curved surfaces forming the grooves 68a and 68b are preferably identical to the diameter of the steel balls or bearing members 34a and 34b or slightly larger than the diameter of the steel balls or bearing members 34a and 34b.

Still referring to FIG. 4, external surface 62 of tubular outer member 32 has a pair of cylindrical end sections 74a, 74b and three cylindrical center sections 75, 76 and 77. The cylindrical end sections 74a and 74b have annular bulges 78a and 78b, respectively, which are located opposite annular grooves 68a and 68b. Likewise, the cylindrical center sections 75–77 of external surface 62 are opposite the center cylindrical surfaces 65–67 of the internal surface 60. In other words, when the sleeve 32a (FIG. 5) is deformed to create outer tubular member 32 (FIG. 4), the external surface 62 is deformed to correspond to the deformation of the internal surface 60.

Referring now to FIG. 2, retainers 36a and 36b are generally annular ring-shaped members, which are preferably constructed of a synthetic resin such as the synthetic resin Duran. Retainers 36a and 36b are relatively conventional members, which are well known in the art. Thus, retainers 36a and 36b will not be discussed or illustrated in detail herein. Basically, retainers 36a and 36b are formed of an annular ring-shaped portion and with seven axially extending flanges or spacers which are circumferentially spaced around the ring portion for receiving steel balls or bearing members 34a and 34b therebetween. The retainers 36a and 36b serve to maintain a constant interval between the steel balls or bearing members 34a and 34b, the spaces between the flanges slightly exceeds the diameter of the bearing members to accommodate their rotation.

Referring again to FIG. 2, seals 38a and 38b are preferably annular members constructed of a resilient and/or elastic material such as conventional rubber seals. The seals 38a and 38b are ring-shaped such that the internal diameter of the seal is slightly smaller than the crank spindle 30. Thus, seals 38a and 38b are designed to deform around the outer surface 48 of the crank spindle 30 to create a seal for preventing contaminants from passing between the interface thereof. The outer diameters of seals 38a and 38b are preferably slightly larger than the cylindrical end sections 64a and 64b of the internal surface 60 such that seals 38a and 38b are deformed slightly inwardly when they engage the internal surface 60 of tubular outer member 32. Thus, contaminants are prevented from passing between the interface of internal surface 60 and the external surface of seals 38a and 38b.

First and second adapters 40a and 40b are slightly different from each other. However, these differences are inconsequential as they relate to the present invention. Accordingly, corresponding reference numerals will be utilized to depict corresponding parts of the first and second adapters 40a and 40b. Basically, adapters 40a and 40b are tubular members having external threads 80a and 80b, an external flange 82a and 82b, an internal flange 84a and 84b and a plurality of projections 86a and 86b.

External threads 80a and 80b are designed to engage the internal threads of the bottom bracket shell of the bicycle frame 20 to fixedly secure the bearing assembly 12 thereto. When adapters 40a and 40b are threaded into the bottom bracket shell of the bicycle frame 20, the external flanges 82a and 82b engage the bottom bracket shell 24 of bicycle frame 20, while the internal flanges 84a and 84b engage the first and second ends 58a and 58b of the tubular outer member 32. In this position, axial movement of the bearing assembly 12 is prevented relative to the bottom bracket shell of frame 20. Moreover, longitudinal movement of tubular outer member 32 is also prevented. More specifically, tubular outer member 32 is sandwiched between first and second adapters 40a and 40b to prevent any axial movement relative to the bottom bracket shell 24 or crank spindle 30. Projections 86a and 86b are radially extending flanges that are equally spaced about the circumference of the internal surface of the adapters 40a and 40b. The projections 86a and 86b are designed to be engaged by a spanner at circumferential spaced apart positions for threading adapter 40a and 40b into the bottom bracket shell of bicycle frame 20.

Figure 6:
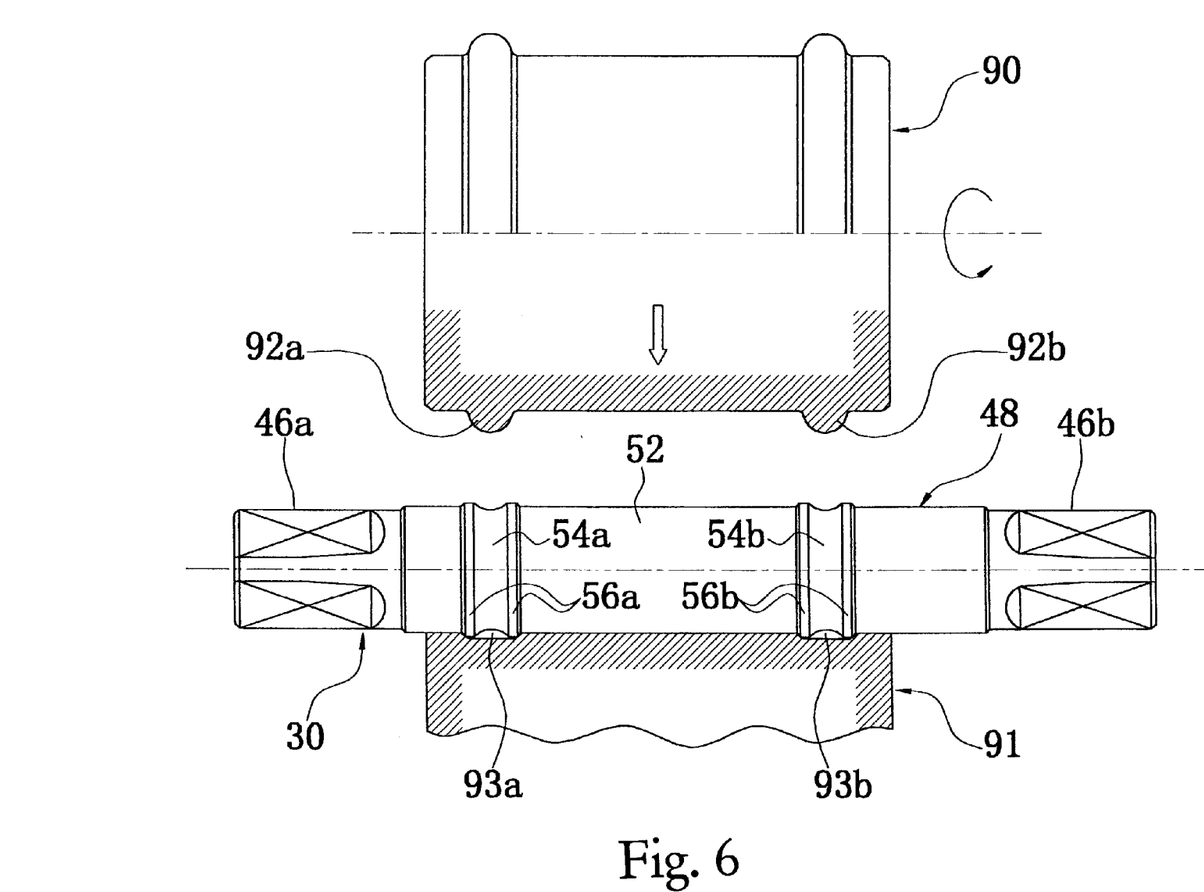
FIG. 6 is a partial schematic longitudinal cross-sectional view of a pair of dies with the crank spindle or inner member of the first bearing assembly being deformed by cold rolling.

Referring now to FIG. 6, the method of manufacturing crank spindle 30 will now be described. First, the crank spindle 30 is manufactured by casting the general shape of the spindle such that it has the general overall shape of the end product. Next, the rough spindle is machined to form the threaded bores 50 at each of the ends of the spindle as well as to remove any imperfections from the casting operation. Then the machined spindle is placed between a pair of dies 90 and 91 to form the grooves 54a and 54b and the races 56a and 56b in the outer surface 48, as schematically shown in FIG. 6.

The first die 90 is a cylindrical die with a pair of annular bulges 92a and 92b having a circular cross-section. These bulges 92a and 92b are designed to form the grooves 54a and 54b. The second die 91 can be either a stationary die or a rotating die. The second die 91 has a pair of recesses 93a and 93b that correspond to the location of the grooves 54a and 54b and the races 56a and 56b, which are being formed on the outer surface 48 of crank spindle 30. The rotating die 90 is move to press annular bulges 92a and 92b against the outer surface 48 of crank spindle 30 to begin forming grooves 54a and 54b. The rotation of die 90 causes crank spindle 30 to rotate therewith. The die 90 is moved slowly relative to die 91 such that with each rotation of crank spindle 30 and die 90, grooves 54a and 54b become gradually deeper and deeper. In other words, as die 90 and/or 91 rotate, the crank spindle 30 also rotates to form grooves 54a and 54b. The spindle 30 and die 90 are continuously rotated until the desired depth and shape of groove 54a and 54b are obtained. On each side of the grooves 54a and 54b are ball races 56a and 56b, which are also formed. The recesses 93a and 93b of second die 91 are shaped to allow ball races 56a and 56b to be deformed into the recesses 93a and 93b of die 91. Once the final shape is formed, the crank spindle 30 can be treated with normal heat treating techniques to obtain the desired hardness.

Accordingly, this procedure creates a very fine surface within the grooves 54a and 54b. In fact, this operation performs a polishing effect along the grooves 54a and 54b. Also, while grooves 54a and 54b are being formed, the ball races 56a and 56b are also being simultaneously formed. This makes the pitch, parallelism and the concentricity of the grooves 54a and 54b and ball races 56a and 56b very stable.

Figure 7:
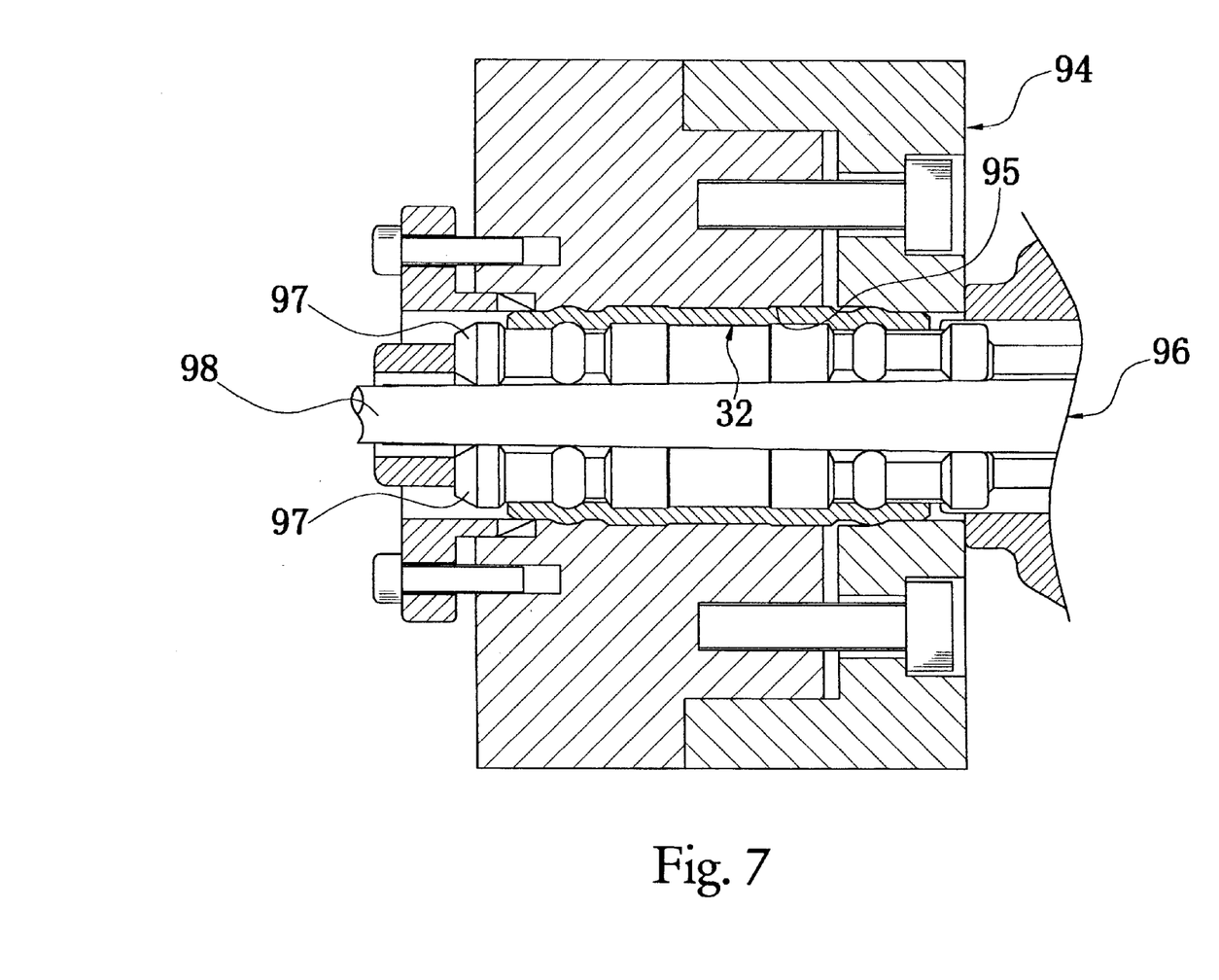
FIG. 7 is a partial schematic longitudinal cross-sectional view of a pair of dies with the outer tubular member of the first bearing assembly being deformed by cold rolling.
Figure 8:
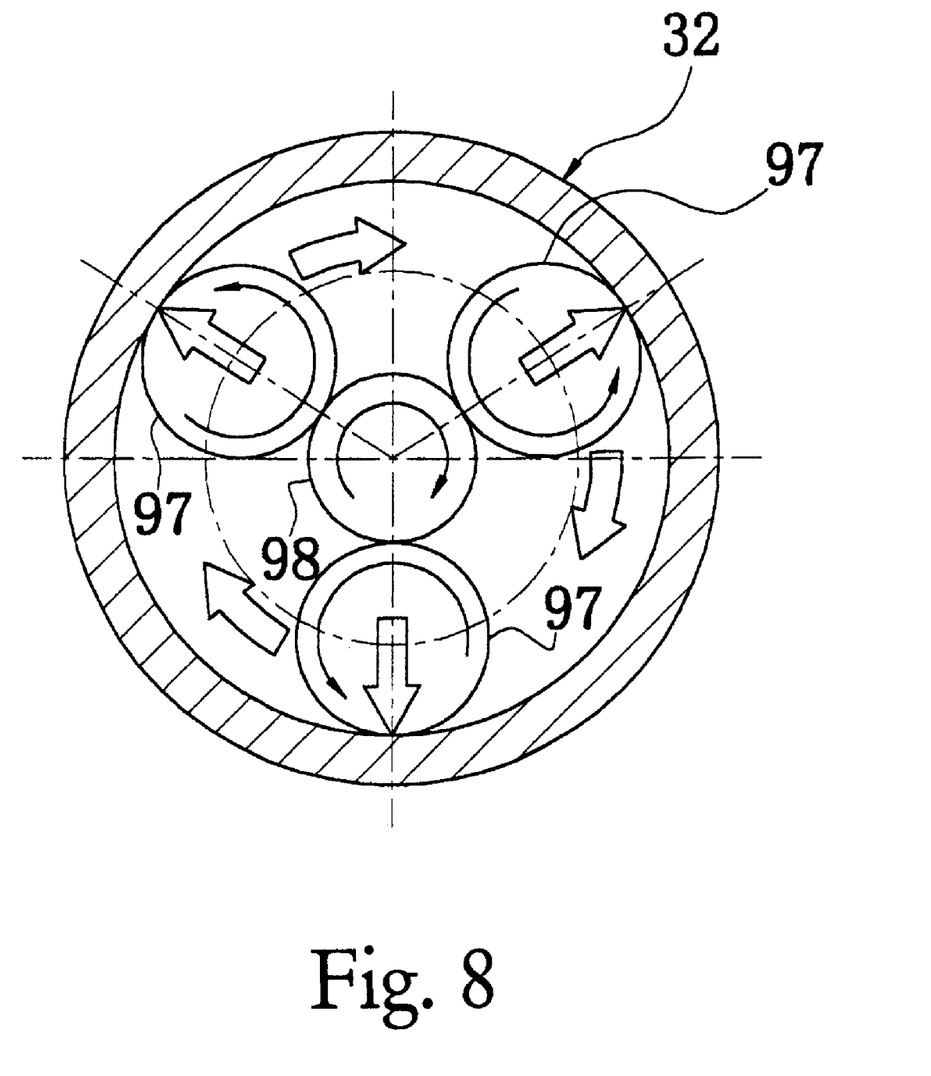
FIG. 8 is a partial schematic end view of the outer tubular member for the first bearing assembly being deformed by cold rolling.

Referring now to FIGS. 4, 5 and 6, the method of manufacturing tubular outer member 32 will now be described. The tubular outer member 32 is also formed by cold rolling. First, the tubular outer member 32 is manufactured by casting a sleeve 32a as seen in FIG. 5. Next, the rough sleeve 32a is machined to remove any imperfections and create any necessary formations needed thereon. Then, the machined sleeve 32a is cold-rolled to form its final shape as shown in FIG. 4. In particular, as shown in FIG. 7, the machined sleeve 32a is inserted into a jig assembly 94 to be deformed. Jig assembly 94 has a tubular bore 95 having at least three cylindrical sections for accommodating the final shape of tubular outer member 32. Now, a special forming die 96 is inserted into the internal bore of the sleeve 32a. This special die 96 includes three rollers 97 and a conically tapered expander 98. The three rollers 97 have external surfaces that correspond to the final profile of the internal surface 60 of tubular outer member 32. The tapered expander 98 is located in the center between the three rollers 97. The rollers are spaced approximately 120° apart from each other around the axis of expander 98. The expander 98 is rotated which in turn causes the three rollers 97 to rotate about their axis, as well as to orbit or rotate about the center axis of the expander 98. Initially, the rollers 97 merely contact the cylindrical surface of the sleeve 32a such that the first rotation barely deforms the internal surface of sleeve 32a. The expander 98 is slowly moved axially so as to cause the rollers 97 to move radially outwardly to begin forming the internal surface 60 of tubular outer member 32. The expander 98 is moved very slowly and incrementally such that the internal surface 60 is gradually formed with each rotation of the rollers 97 about the inner diameter of the internal surface 60 of tubular outer member 32. Once the final shape is formed, the tubular outer member 32 can be treated with normal heat treating techniques to obtain the desired hardness.

Accordingly, this procedure creates a very fine surface within the grooves 68a and 68b. In fact, this operation performs a polishing effect along the grooves 68a and 68b. This makes the pitch, parallelism and the concentricity of the grooves 68a and 68b very stable.

Once the crank spindle 30 and tubular outer member 32 are created in accordance with the present invention, the crank spindle 30 is inserted into the bore of tubular outer member 32 so as to be located between the outer surface 48 of spindle 30 and the internal surface 60 of tubular outer member 32. In particular, the bearing members 34a and 34b are first positioned within the grooves 54a and 54b and grooves 68a and 68b on one side of the spindle 30 and on one side of the internal surface 60 of tubular outer member 32. Then, the bearing members 34a and 34b are moved around the grooves 54a and 54b of crank spindle 30 to be substantially equally spaced apart from each other within the grooves 54a and 54b and 68a and 68b.

Now, the retainers 36a and 36b are inserted through the open ends 58a and 58b of tubular outer member 32 and over the ends 50a and 50b of crank spindle 30 to hold the bearing members 34a and 34b in their correct positions. Once the retainers are in place, seals 38a and 38b are inserted over the ends 50a and 50b of crank spindle 30 and through the open ends 58a and 58b of tubular outer member 32. This results in the external surfaces of the seals 38a and 38b being deformed against the cylindrical end sections 64a and 64b of the internal surface 60 of the tubular outer member 32. The inner surfaces of seals 38a and 38b are also deformed against the outer surface 48 of crank spindle 30.

Finally, with the crank spindle 30 and the tubular outer member 32 positioned within the bottom bracket shell 24 of the bicycle frame 20, the pair of adapters 40a and 40b are threaded into the bottom bracket shell 24 of the bicycle frame 20 to fixedly secure bearing assembly 12 to bicycle frame 20. This completes the installation of the bearing assembly 12. Of course, now the cranks 26 can be installed onto the crank spindle 30 via fixing bolts 42 in a conventional manner.

Figure 9:
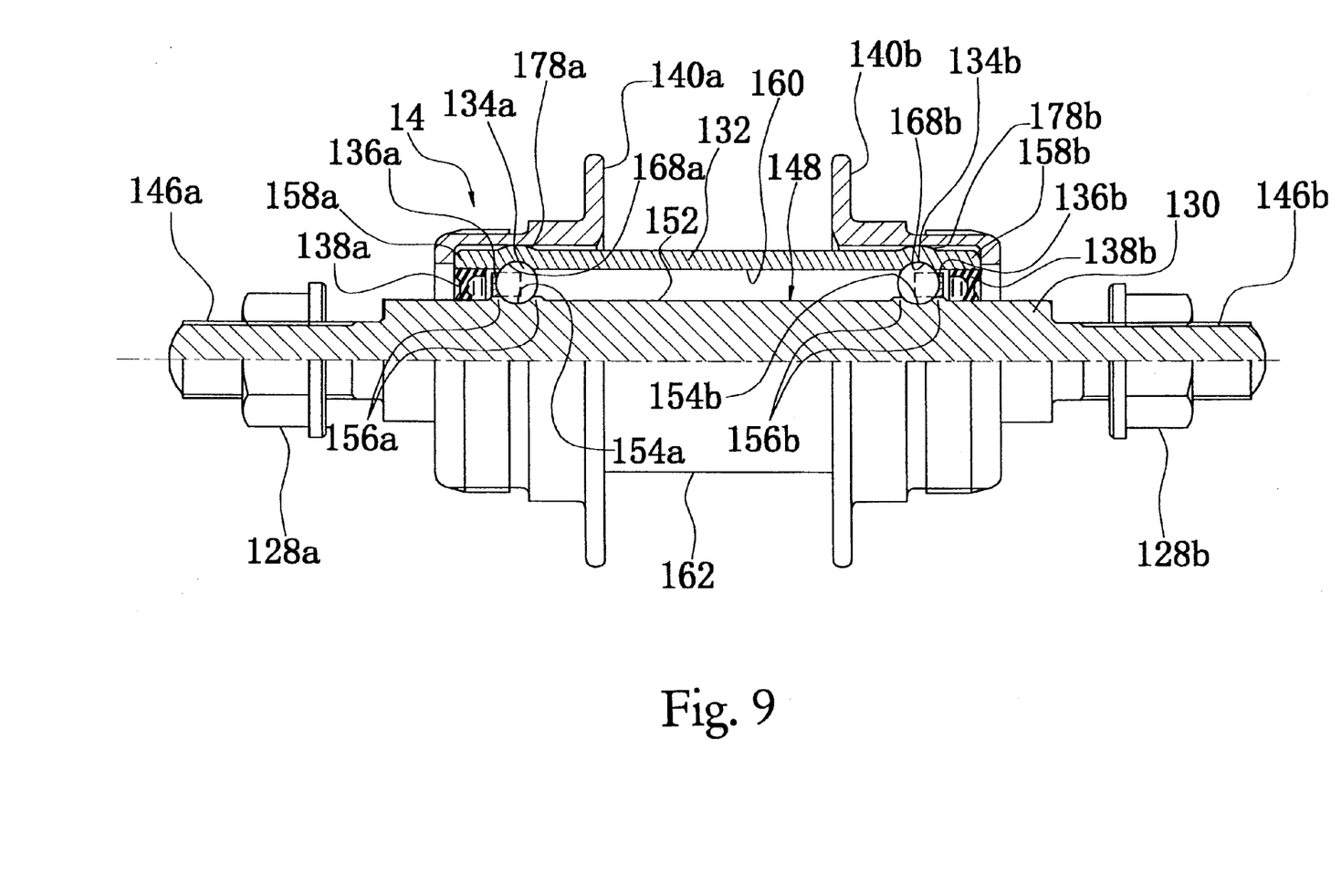
FIG. 9 is a partial longitudinal cross-sectional view of a second bearing assembly, which forms the front hub of the bicycle illustrated in FIG. 1.

Referring now to FIG. 9, a partial cross-sectional view of the second bearing assembly 14 is illustrated in accordance with the present invention. This second bearing assembly 14 is constructed in substantially the same manner as the first bearing assembly 12 of FIGS. 1–8, discussed above, except that second bearing assembly 14 is a bicycle hub. In view of the similarities between second bearing assembly 14 and first bearing assembly 12, the second bearing assembly 14 will not be discussed or illustrated in detail herein. Rather, the description of the parts of the first bearing assembly 12, which are similar to the parts second bearing assembly 14, applies to the parts second bearing assembly 14.

Bearing assembly 14 forms the front hub of the front bicycle wheel 22 for rotatably coupling front bicycle wheel 22 to bicycle frame 20. Bearing assembly 14 basically includes an elongated inner member or hub axle 130, a tubular outer member or hub shell 132, two sets of bearing members 134a and 134b, a pair of retainers or cages 136a and 136b, a pair of seals 138a and 138b and a pair of hub flanges 140a and 140b.

Hub axle 130 is designed to rotate within tubular outer member 132 via bearing members 134a and 134b. Accordingly, hub axle 130 acts as an inner race, which is fixedly coupled to frame 20, while tubular outer member 132 acts as an outer race, which is fixedly coupled to wheel 22. The bearing members 134a and 134b are preferably steel balls with each set of bearing members 134a and 134b having seven steel balls therein. Of course, it will be apparent to those skilled in the art from this disclosure that fewer or more steel balls can be utilized in each set of bearing members 134a and 134b.

Hub axle 130 is an elongated member having a first end 146a, a second end 146b and an outer surface 148 extending between first end 144a and second end 146b. First and second ends 146a and 146b are threaded for threadedly receiving hub fasteners 128a and 128b to fixedly secure wheel 22 to bicycle frame 20. While hub fasteners 128a and 128b are shown as hub nuts, it will be apparent to those skilled in the art from this disclosure that the hub fasteners can be a quick release lever and a quick release nut.

Hub axle 130 has a center section 152 located between first and second ends 146a and 146b. Center section 152 has a pair of annular raised portions with first and second annular grooves 154a and 154b formed therein for receiving bearing members 134a and 134b. Also a pair of races 156a and 156b are formed on the sides of grooves 154a and 154b for retaining bearing members 134a and 134b therein, respectively.

Grooves 154a and 154b of hub axle 130 are grooves of a circular cross-section for supporting steel balls or bearing members 134a and 134b. The diameter of the grooves 154a and 54b are substantially equal to the diameter of the steel balls or bearing members 134a and 134b or slightly larger than the diameter of the steel balls or bearing members 134a and 134b. Accordingly, bearing members 134a and 314b can freely rotate and move about the circumference of annular grooves 154a and 154b.

The tubular outer member or hub shell 132 has a first open end 158a, a second open end 158b, an internal surface 160 and an external surface 162. The internal and external surfaces 160 and 162 extend between the first and second open ends 158a and 158b of tubular outer member 132. Preferably, tubular outer member 132 is constructed of a conventional metallic material. Tubular outer member 132 is initially a tubular or cylindrical sleeve. The sleeve is cold rolled to form the profile of the tubular outer member 132 as seen in FIG. 9.

In particular, the internal surface 160 is contoured to form a pair of annular groove 168a and 168b formed therein for engaging bearing members 134a and 134b. Preferably, the grooves 168a and 168b are grooves of a circular cross-section for supporting bearing members 134a and 134b. The diameter of the curved surfaces forming the grooves 168a and 168b are preferably identical to the diameter of the steel balls or bearing members 134a and 134b or slightly larger than the diameter of the steel balls or bearing members 134a and 134b.

External surface 162 of tubular outer member 132 has a pair of annular bulges 178a and 178b, respectively, which are located opposite annular grooves 168a and 168b. In other words, when the sleeve is deformed to create outer tubular member 132, the external surface 162 is deformed to correspond to the deformation of the internal surface 160.

Retainers 136a and 136b are generally annular ring-shaped members, which are preferably constructed of a synthetic resin such as the synthetic resin Duran. Retainers 136a and 136b are relatively conventional members, which are well known in the art. Thus, retainers 136a and 136bwill not be discussed or illustrated in detail herein. Basically, retainers 136a and 316b are formed of an annular ring-shaped portion and with seven axially extending flanges or spacers which are circumferentially spaced around the ring portion for receiving steel balls or bearing members 134a and 134b therebetween. The retainers 136a and 136b serve to maintain a constant interval between the steel balls or bearing members 134a and 134b, the spaces between the flanges slightly exceeds the diameter of the bearing members to accommodate their rotation.

Seals 138a and 138b are preferably annular members constructed of a resilient and/or elastic material such as conventional rubber seals. The seals 138a and 138b are ring-shaped such that the internal diameter of the seal is slightly smaller than the hub axle 130. Thus, seals 138a and 138b are designed to deform around the outer surface 148 of hub axle 130 to create a seal for preventing contaminants from passing between the interface thereof. The outer diameters of seals 138a and 138b are preferably slightly larger than the internal surface 160 such that seals 138a and 318b are deformed slightly inwardly when they engage the internal surface 160 of tubular outer member 132. Thus, contaminants are prevented from passing between the interface of internal surface 160 and the external surface of seals 138a and 138b.

Hub flanges 140a and 140b can be slightly different from each other. However, these differences are inconsequential as they relate to the present invention. Accordingly, corresponding reference numerals will be utilized to depict corresponding parts of the first and second hub flanges 140a and 140b. Basically, hub flanges 140a and 140b are tubular members that are frictionally secured on tubular outer member 130. Hub flanges 140a and 140b have outer flanges 182a and 182b and inner flanges 184a and 184b, respectively. The outer flanges 182a and 182b have a plurality of holes for coupling spokes or the like thereto. Inner flanges 184a and 184b abut against the ends of the tubular outer member 132.

Turning now to third bearing assembly 16, rear wheel 22 is rotatably coupled to frame 20 by the third bearing assembly 16. The third bearing assembly 16 is substantially identical to the second bearing assembly 14 except that third bearing assembly 16 is a rear or free hub. Accordingly, it will be understood by those skilled in the art that the construction and method of manufacturing first bearing assembly 12 and second bearing assembly 14 can also be applied to that the construction and method of manufacturing third bearing assembly 16. Thus, the third bearing assembly 16 will not be discussed or illustrated in detail herein.

While several particular embodiments have been chosen to illustrate the present invention, it will be understood by those skilled in the art that various changes and modifications can be made herein without departing from the scope of the invention as defined in the appended claims. Furthermore, the foregoing description of the preferred embodiments of the present invention is provided for illustration only, and not for the purpose of limiting the invention as defined by the appended claims and their equivalents.

What is claimed is:

1. A bicycle bearing assembly, comprising:
    an elongated inner member having a first end, a second end, and an outer surface extending therebetween, with a first annular groove formed in said outer surface of said elongated inner member;
    a tubular outer member having a first open end, a second open end, and internal and external surfaces extending between said first and second open ends of said tubular outer member, with said internal surface deformed to form a second annular groove in said internal surface of said tubular outer member and a first annular bulge in said external surface by formation of said second annular groove; and
    a plurality of first bearing members located between said first annular groove of said elongated inner member and said second annular groove of said tubular outer member.

2. A bicycle bearing assembly according to claim 1, wherein said outer surface of said elongated inner member has a third annular groove formed therein;
    said tubular outer member has a fourth annular groove formed in said internal surface of said tubular outer member and a second annular bulge in said external surface of said tubular outer member by formation of said third annular groove; and
    a plurality of second bearing members located between said third annular groove of said elongated inner member and said fourth annular groove of said tubular outer member.

3. A bicycle bearing assembly according to claim 2, wherein said elongated inner member is crank spindle with said first and second ends being configured to rotatably couple bicycle cranks thereto.

4. A bicycle bearing assembly according to claim 3, further comprising a first annular adapter having external threads and an internal flange abutting said first end of said tubular outer member.

5. A bicycle bearing assembly according to claim 4, further comprising
a second annular adapter having external threads and an internal flange abutting said second end of said tubular outer member.

6. A bicycle bearing assembly according to claim 2, further comprising
first and second annular seals located between said outer surface of said elongated inner member and said internal surface of said tubular outer member.

7. A bicycle bearing assembly according to claim 2, wherein
said annular grooves of said elongated inner member have a curved surface in axial cross section, and said annular grooves of said tubular outer member have a curved surface in axial cross section.

8. A bicycle bearing assembly according to claim 7, wherein
said first and second bearing members are rolling elements with a predetermined rolling diameter.

9. A bicycle bearing assembly according to claim 8, wherein
said curved surfaces of said annular grooves of said elongated inner member and said tubular outer member have predetermined diameters which are at least as large as said predetermined rolling diameters of said first and second bearing members.

10. A bicycle bearing assembly according to claim 9, wherein
said elongated inner member is crank spindle with said first and second ends being configured to rotatably couple bicycle cranks thereto.

11. A bicycle bearing assembly according to claim 10, further comprising
a first annular adapter having external threads and an internal flange abutting said first end of said tubular outer member.

12. A bicycle bearing assembly according to claim 11, further comprising
a second annular adapter having external threads and an internal flange abutting said second end of said tubular outer member.

13. A bicycle bearing assembly according to claim 2, wherein
said elongated inner member is a hub axle with said first and second ends being configured to be fixedly coupled to a portion of a bicycle frame, and said tubular outer member is a hub shell.

14. A bicycle bearing assembly according to claim 13, further comprising
a first annular hub flange having an outer connecting flange and an inner flange abutting said first end of said tubular outer member.

15. A bicycle bearing assembly according to claim 14, further comprising
a second annular hub flange having an outer connecting flange and an inner flange abutting said second end of said tubular outer member.

16. A bicycle bearing assembly according to claim 15, further comprising
first and second annular seals located between said outer surface of said elongated inner member and said internal surface of said tubular outer member.

17. A bicycle bearing assembly according to claim 13, wherein
said annular grooves of said elongated inner member have a curved surface in axial cross section, and said annular grooves of said tubular outer member have a curved surface in axial cross section.

18. A bicycle bearing assembly according to claim 17, wherein
said first and second bearing members are rolling elements with a predetermined rolling diameter.

19. A bicycle bearing assembly according to claim 18, wherein
said curved surfaces of said annular grooves of said elongated inner member and said tubular outer member have predetermined diameters which are at least as large as said predetermined rolling diameters of said first and second bearing members.

20. A bicycle bearing assembly according to claim 13, further comprising
a first hub fastening member coupled to said first end of said elongated inner member and a second hub fastening member coupled to said first end of said elongated inner member.

21. An outer race for a bicycle bearing assembly, comprising:
a first open end;
a second open end; and
a tubular member with internal and external surfaces extending between said first and second open ends, said internal surface deformed to form a first annular groove in said internal surface and a first annular bulge in said external surface by formation of said first annular groove.

22. An outer race for a bicycle bearing assembly according to claim 21, wherein
said tubular member has a second annular groove formed in said internal surface and a second annular bulge in said external surface by formation of said second annular groove.

23. An outer race for a bicycle bearing assembly according to claim 22, wherein
said annular grooves of said tubular member have a curved surface in axial cross section.

24. An outer race for a bicycle bearing assembly according to claim 22, wherein
said first annular groove of said tubular member is located adjacent said first open end and said second annular groove of said tubular member is located adjacent said second open end.

25. An outer race for a bicycle bearing assembly according to claim 22, wherein
said first annular groove of said tubular member is substantially identical to said second annular groove of said tubular member.

* * * * *